United States Patent
Aldridge et al.

(10) Patent No.: US 12,396,391 B2
(45) Date of Patent: Aug. 26, 2025

(54) CONTROL GRIP SHAPE FOR ZERO-TURN MOWER, CONTROL GRIP FOR ZERO-TURN LAWNMOWER, AND LAWNMOWER

(71) Applicant: Honda Motor Co., Ltd., Tokyo (JP)

(72) Inventors: Teegan L. Aldridge, Graham, NC (US); Robert A. Recher, Mebane, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 885 days.

(21) Appl. No.: 17/578,740

(22) Filed: Jan. 19, 2022

(65) Prior Publication Data
US 2023/0225245 A1    Jul. 20, 2023

(51) Int. Cl.
| A01D 34/00 | (2006.01) |
| A01D 34/64 | (2006.01) |
| A01D 34/82 | (2006.01) |
| A01D 69/00 | (2006.01) |
| A01D 69/03 | (2006.01) |
| A01D 101/00 | (2006.01) |

(52) U.S. Cl.
CPC ........... *A01D 34/824* (2013.01); *A01D 34/64* (2013.01); *A01D 69/03* (2013.01); *A01D 2101/00* (2013.01)

(58) Field of Classification Search
CPC .... A01D 34/824; A01D 34/64; A01D 34/905; A01D 34/66; A01D 34/69; A01D 69/03; A01D 69/10; B63H 16/04; B65D 25/32; A45F 5/1046; B25F 5/006; B25G 1/102
See application file for complete search history.

(56) References Cited

U.S. PATENT DOCUMENTS

| 3,713,350 | A | 1/1973 | Brilando |
| 4,212,363 | A | 7/1980 | Letner et al. |
| 4,471,209 | A | 9/1984 | Hollander |
| 4,964,192 | A | 10/1990 | Marui |
| 4,972,733 | A | 11/1990 | Olmr et al. |
| 5,797,165 | A | 8/1998 | Armbrust |
| 6,530,200 | B1 * | 3/2003 | Minoura ................ A01D 34/64 56/15.2 |
| 6,648,535 | B2 * | 11/2003 | Ferrara, Jr. ............ B25G 1/102 401/6 |
| 7,159,377 | B2 | 1/2007 | Ross et al. |
| 7,430,847 | B2 | 10/2008 | Hoffman et al. |
| 9,346,528 | B2 | 5/2016 | Webb |
| 9,580,133 | B2 | 2/2017 | Aymar |

(Continued)

FOREIGN PATENT DOCUMENTS

| CN | 201291448 Y | 8/2009 |
| CN | 202531734 U | 11/2012 |

(Continued)

*Primary Examiner* — Joseph M Rocca
*Assistant Examiner* — Robert E Pezzuto
(74) *Attorney, Agent, or Firm* — KENEALY VAIDYA LLP

(57) ABSTRACT

A lawnmower and lawnmower control handle can include a bar configured to pivot in a direction of an input force applied by an operator and a grip having an outer surface that is a non-circular shape and an inner surface that is a different shape than the shape of the outer surface. The bar can be located inside the grip and disposed against the inner surface of the grip.

5 Claims, 7 Drawing Sheets

(56) References Cited

U.S. PATENT DOCUMENTS

| | | |
|---|---|---|
| 9,952,618 B2 | 4/2018 | Stewart |
| D857,475 S * | 8/2019 | Lapp ................................ D8/303 |
| D857,476 S * | 8/2019 | Lapp ................................ D8/303 |
| 10,875,682 B1 * | 12/2020 | Laudon .................. B65D 25/32 |
| 2003/0024074 A1 | 2/2003 | Hartman |
| 2004/0007087 A1 | 1/2004 | Cummings |
| 2010/0212453 A1 | 8/2010 | Rouillard |

FOREIGN PATENT DOCUMENTS

| | | |
|---|---|---|
| CN | 202572347 U | 12/2012 |
| CN | 203410574 U | 1/2014 |
| CN | 104527063 B | 8/2016 |
| EP | 3492224 A1 | 6/2019 |
| WO | 2009083330 A1 | 7/2009 |

\* cited by examiner

CONTROL GRIP SHAPE FOR ZERO-TURN MOWER, CONTROL GRIP FOR ZERO-TURN LAWNMOWER, AND LAWNMOWER

BACKGROUND

The disclosed subject matter relates to a lawnmower. More particularly, the disclosed subject matter relates to an apparatus for a control grip handle of a zero-turn radius (ZTR) lawnmower.

Lawnmowers can be manually propelled, such as a push mower, or they can be self-propelled. Push mowers can rely on the force generated by an operator to move. Self-propelled lawnmowers can have a power source such as a motor to move the lawnmower. Various categories of lawnmowers include walk-behind, stand-on, or riding mowers. These categories of lawnmowers typically rely on an operator to control the direction of the lawnmower while in use. Thus, most types of lawnmowers can include a handle or handles that provide an operator control over the lawnmower's direction, speed, cutting style, and other characteristics.

SUMMARY

Some embodiments are directed toward a control handle for a zero-turn radius lawnmower having a hydrostatic transmission (HST). The control handle can include a bar configured to pivot in a direction of an input force applied by an operator to allow a variable output force of the hydrostatic transmission. The control handle can include a grip having an outer surface that is a non-circular shape and an inner surface that is a different shape than the shape of the outer surface, wherein the bar is inserted inside the grip and disposed against the inner surface.

In accordance with another embodiment of the disclosed subject matter, a control handle for a zero-turn radius lawnmower having a hydrostatic transmission can include a bar configured to pivot in a direction of an input force applied by an operator to allow a variable output force of the hydrostatic transmission. The control handle can include a grip having an inner ring, an outer ring, and a webbing that connects the inner ring to the outer ring, wherein the bar is inserted inside the grip and the inner ring is disposed against the bar.

In accordance with yet another aspect of the disclosed subject matter, some embodiments are directed toward a lawnmower. The lawnmower can include a frame, a deck suspended from the frame and including a cutting chamber, a power source mounted on the frame, and at least one blade rotatably supported in the cutting chamber and rotationally driven by the power source. The lawnmower can include a pair of control handles connected to and extending away from the frame. Each of the control handles can include a bar configured to pivot in a direction of an input force applied by an operator and a grip having an inner surface that is circular and an outer surface that is non-circular, wherein each bar is inserted inside a respective one of the grips and disposed against the inner surface. The lawnmower can include a pair of hydraulic pumps each pivotably connected to a respective one of the control handles. The lawnmower can include a pair of hydraulic motors each in fluid communication with a respective one of the hydraulic pumps. The lawnmower can include a pair of drive wheels, wherein each hydraulic motor drives a respective one of the drive wheels.

BRIEF DESCRIPTION OF THE DRAWINGS

The disclosed subject matter of the present application will now be described in more detail with reference to exemplary embodiments of the apparatus, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Zero-turn radius (ZTR) lawnmowers can include control handles, which can be used to steer the lawnmower in a forward, reverse, left, and right direction. An operator of a ZTR mower can push or pull on the control handles to change the lawnmower's speed and direction. Most maneuvering controls, such as forward motion control, reverse motion control, or turning of the ZTR lawnmower can require pushing or pulling the control handles while grasping, gripping, or holding the control handles. Operators can use the ZTR mower for an extended period of time. Specifically, the operator can hold, grip, or grasp the control handles of the ZTR mower for many consecutive hours while operating the lawnmower.

Accordingly, there is a need for the control handles of a ZTR lawnmower to provide improved comfort to the operator. Increased comfort of the operator's hands while gripping, holding, or grasping the control handles can increase the amount of time the operator is able to use the ZTR lawnmower.

Figure 1:
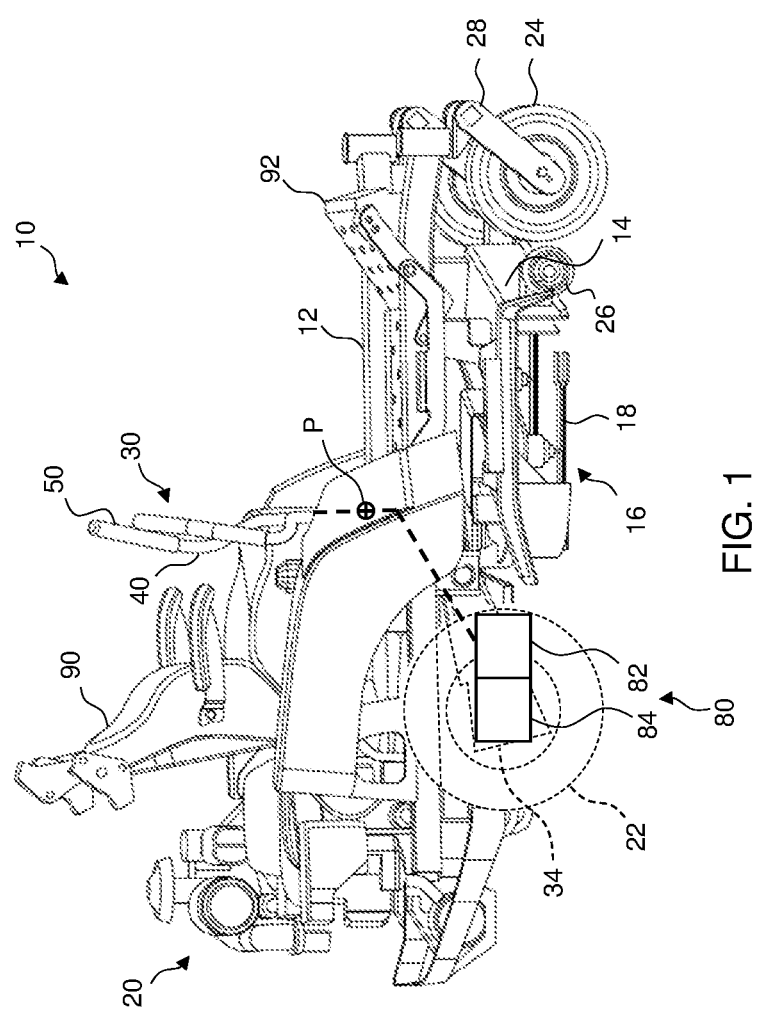
FIG. 1 is a side view of a lawnmower made in accordance with principles of the disclosed subject matter and schematically showing one of the control handles connected to a transmission.

FIG. 1 is a side view of a lawnmower 10 made in accordance with principles of the disclosed subject matter. Referring to FIG. 1, the lawnmower 10 can include a frame 12, a deck 14, a power source 20, at least one blade 18, a pair of control handles 30, a suspension member 34, a transmission 80, a pair of pumps 82, a pair of motors 84, a pair of drive wheels 22, and a pair of grips 50.

Figure 2:
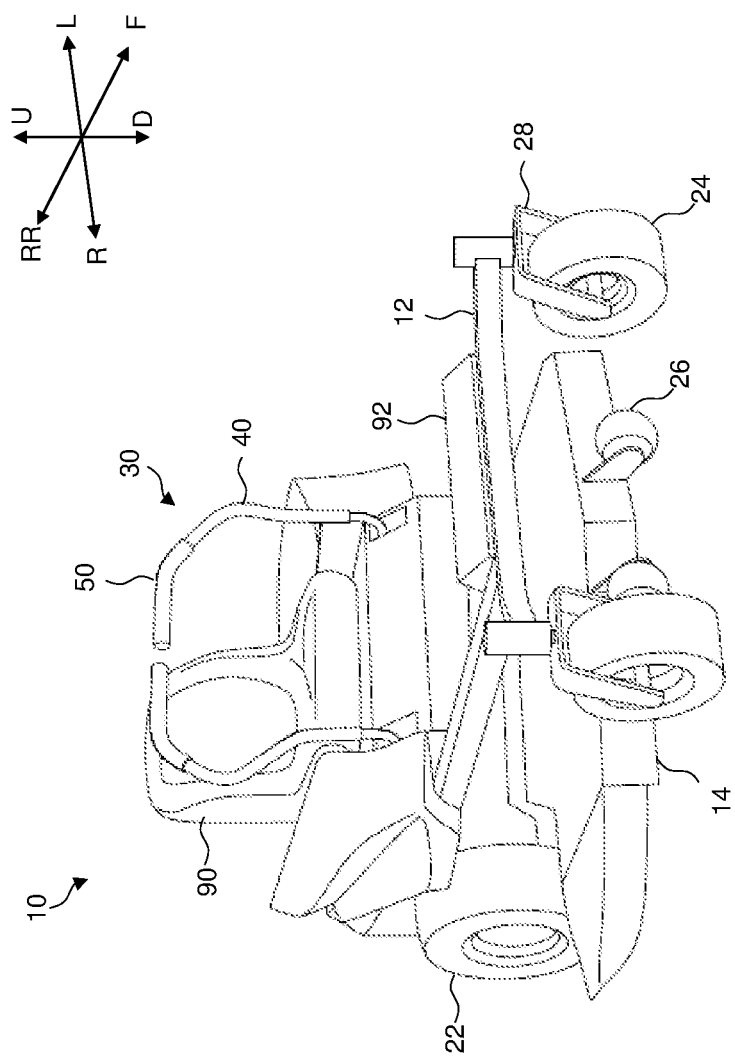
FIG. 2 is a perspective view of another embodiment of a lawnmower made in accordance with principles of the disclosed subject matter.

FIG. 2 is a perspective view of another embodiment of a lawnmower 10 made in accordance with principles of the disclosed subject matter. Referring to FIG. 2, the lawnmower 10 can extend in a forward direction F, a rearward direction RR, a leftward direction L, a rightward direction R, a downward direction D and an upward direction U. The upward direction U and the downward direction D can be parallel to a blade rotational axis BA and can be opposite directions with respect to each other. The directions F, RR, and L, R, and U, D can be orthogonal to each other, respectively.

Referring to FIGS. 1 and 2, there is shown a lawnmower 10 including a frame 12. The frame 12 can be a solid frame, but can also include or consist of hollow frame portions. Frame 12 can also include cut out portions to reduce weight. Frame 12 can be of the same thickness or have variable thickness in different portions of frame 12. Suitable materials for construction of the frame 12 include metallic material, plastic material, alloy material, carbon fiber material, any combination thereof, or any material capable of providing strength to support the components of a lawnmower.

Referring to FIGS. 1 and 2, there is shown a lawnmower 10 including a deck 14 suspended from the frame 12 and including a cutting chamber 16. The deck 14 can be suspended from the frame 12 with any type of linkage that allows movement in the upward U or downward D direction towards or away from the frame 12. Examples of how the deck 14 can be suspended from the frame 12 include, but are not limited to, chains, supports, springs, or lifts. The deck 14 can move upward U or downward D in response to mechanical forces, such as mechanical forces that are transmitted to the deck via following rollers and any of a mechanical linkage, hydraulic linkage or other type of linkage. Alternatively, the deck 14 can move upward or downward in response to electrical signals such as electric signals provided by sensors located on the lawnmower. The deck 14 can be removably attached to the frame 12 and can be made of a metallic material, an alloy, a carbon fiber, a plastic, or any material known in the art for housing a cutting chamber 16.

The deck 14 can include at least one pair of deck wheels 26 attached directly to the deck 14 or attached through a linkage such as a mount. The deck wheels 26 can provide a support for the deck 14 when the lawnmower is in operation to create a clearance between the deck 14 and the ground. The at least one pair of deck wheels can absorb force in an upward U or downward D direction to maintain a clearance between the deck 14 and the ground. The at least one pair of deck wheels 26 can include multiple pairs of deck wheels 26 disposed around the deck 14. The deck wheels can be rubber, plastic, or any material known in the art for providing a support to create clearance between the deck 14 and the ground.

Referring to FIG. 1, there is shown a lawnmower 10 including a cutting chamber 16. Cutting chamber 16 can be included in the deck 14 and can house at least one blade 18. The cutting chamber 16 can house only one blade or the cutting chamber can house multiple blades 18. The cutting chamber 16 can also house blades in different patterns. Examples of blade patterns can include, but are not limited to, a linear pattern, a staggered pattern, an overlapping pattern, or any other pattern known to one in the art for arranging blades on a lawnmower.

The at least one blade 18 can be rotatably supported in the cutting chamber 16 and rotationally driven by the power source 20. The at least one blade 18 can rotate in a clockwise or counterclockwise direction around the blade rotational axis BA when driven by the power source 20. The at least one blade 18 can be detachable from the cutting chamber 16 and can be metal, metal alloy, ceramic, or any material that is suitable for cutting as used in a lawnmower.

The lawnmower 10 can include a suspension member 34 connected to the frame 12 and the pair of drive wheels 22. In some embodiments, the suspension member 34 can have the transmission 80 mounted thereon.

The power source 20 of the lawnmower 10 can be mounted on the frame 12. The power source 20 can be mounted on the frame 12 behind a seat 90 or at any location that allows the power source 20 to provide power to the lawnmower 10. The power source 20 can be an internal combustion engine, an electric motor, or a hybrid of an internal combustion engine and an electric motor.

At least one pair of caster wheels 24 can be mounted on the frame 12. The caster wheels 24 can be mounted directly to the frame 12 or attached with any type of connection known to one in the art such as wheel mounts 28. At least one pair of caster wheels 24 can be mounted or attached to the frame 12 on a forward direction F of the frame 12. Caster wheels 24 can be attached on a reverse direction RR of the frame 12 or a combination of multiple directions of the frame 12.

A footplate 92 can be attached to the frame 12. The footplate can be part of the frame 12 or a separate structure mounted thereon. The footplate 92 can be disposed in front of a seat 90 in the forward direction F. The control handles 30 can be disposed between the seat 90 and the footplate 92 in a longitudinal direction of travel. The control handles 30 can be disposed behind the footplate 92 in a reverse direction RR of the lawnmower 10.

The seat 90 of the lawnmower 10 can be mounted on the frame 12. The seat can be disposed behind (in a reserve direction RR) and below (in a downward direction D) the control handles 30. The seat 90 can be disposed above (in an upward direction U) the pair of drive wheels 22. The seat can be made of plastic, foam, metal, any combination thereof, or any material known to one in the art of seats for lawnmowers.

The lawnmower 10 can include a pair of control handles 30 each connected to a separate portion of a transmission 80 that includes a pump 82 and a motor 84. The control handles 30 can be pivotably connected to the frame 12 to pivot around a pivot point P. In the exemplary embodiment, the transmission 80 can be a hydrostatic transmission that can include a hydraulic pump and a hydraulic motor. The control handles 30 can each be connected to a respective one of the pumps 82. Each one of the pair of control handles 30 can be connected to a respective one of the motors 84. Each control handle 30 can be directly connected to the transmission 80 or each control handle 30 can be connected to the transmission 80 through any number of intermediary linkages. In the exemplary embodiment, the control handles 30 can be pivotably mounted to the frame such than an input force by the operator on the control handle 30 causes the control handle 30 to pivot around P and output force to a hydraulic pump 82 resulting in a variation in output force by a hydraulic motor 84.

The pair of control handles 30 can pivot in the forward direction F and the rear direction RR around pivot point P. That is, the control handles 30 can pivot in a substantially horizontal direction towards or away from the operator (and seat 90) in response to an input force by an operator of the lawnmower 10 through a pushing or pulling of the control handles 30. Additionally, the pair of control handles 30 can pivot in directions other than a forward F and reverse RR direction, or can slide in forward or reverse directions to cause the actuation of the transmission 80. The pair of control handles 30 can also be configured to pivot or move in a direction that does not cause any force output by the transmission. For example, the pair of control handles 30 can pivot or slide outward in the left direction L and the right direction R to allow an operator to have additional space to access the seat 90 of the lawnmower 10.

The pair of pumps 82 can each be pivotably connected to a respective one of the control handles 30. Each of the pumps 82 can be directly connected to one of the respective control handles 30 or through any number of intermediary linkages. Each pump 82 can be pivotably connected to one of the respective control handles 30 independent of the other pump 82 and the other control handle 30. The pair of pumps 82 can be hydraulic pumps 82 that are in fluid communication with a respective one of a pair of hydraulic motors 84.

The pair of motors 84 can each be in fluid communication with a respective one of the pumps 82. Each of the motors 84 can be connected to one of the control handles 30. A motor 84 and a pump 82 can constitute the transmission 80 that drives one or more of the drive wheels 22. In the exemplary embodiment, the transmission includes an HST having a hydraulic pump and a hydraulic motor.

The lawnmower 10 can include a pair of drive wheels 22 and each one of the pair of drive wheels 22 can be driven by a respective one of the motors 84. The pair of drive wheels 22 can be attached to a suspension member 34 that is connected the frame 12. Each drive wheel 22 can be disposed on a side of the lawnmower 10 opposite the other drive wheel 22. For example, one of the pair of drive wheels 22 can be disposed on the left L side of the lawnmower 10 and the other of the pair of drive wheels 22 can be disposed on the right R side. Each of the drive wheels 22 can be driven independently with respect to each other. For example, one of the drive wheels 22 can be driven in a forward direction F while the other one of the drive wheels 22 can be driven in a reverse direction RR.

The pair of control handles 30 can also be referred to as control arms, control levers, steering controls, steering levers, sticks, control sticks, or motion control levers. The control handles 30 can be connected to and extend away from the frame 12. Each of the control handles 30 can connect to a transmission 80 that can include a pump 82 and a motor 84. The control handles 30 can include a bar 40 configured to pivot in a direction of an input force applied by an operator. The control handles 30 can pivot at a pivot point P located on the frame 12. Each control handle 30 can be one continuous piece. Alternatively, each control handle 30 can be an assembly of multiple connected pieces. The control handles 30 can be formed of metal, plastic, alloy, carbon fiber, or any material suitable for receiving an input force from an operator and remaining rigid such that it can pivotably connect to a pump 82.

The control handles 30 can allow an operator to control a variable output force from a drivetrain. The drivetrain can be any type of drivetrain that allows independent drive of each one of the respective pair of drive wheels 22. In the exemplary embodiment shown in FIG. 1, the drivetrain can include a hydrostatic transmission (HST) 80. The control handles 30 can be pivotably connected to a respective one of the hydraulic pumps 82 and/or hydraulic motors 84. The control handles 30 can be directly connected to the frame 12, a hydraulic motor, a hydraulic pump, or any combination thereof. Alternatively, the control handles 30 can be connected to the frame 12 and the motor 84 or pump 82 through any number of intermediary linkages such as a bracket, lever, cable, or other kinematic or hydraulic linkage.

Each one of the pair of control handles 30 can direct a respective one of the drive wheels 22 in a direction of operator input. The control handles 30 can pivot in a forward direction F of the lawnmower 10 and a reverse direction RR of the lawnmower 10. Each control handle 30 can pivot independently of the other control handle 30 such that the operator can push one control handle 30 in one direction and the other control handle 30 in an opposite direction. As a result, the operator can apply force on one control handle 30 in a forward direction F to drive one of the drive wheels 22 forward F and apply force on the other control handle 30 in a reverse direction RR to drive the other drive wheel 22 in reverse R. In the exemplary embodiment shown in FIG. 1, the control handles 30 can pivot such that an input force from an operator of the lawnmower 10 can vary the flow rate of the pair of hydraulic pumps 82 or the output of the hydraulic motor in an HST.

The control handles 30 can include a bar 40 (also referred to as pipe, tubing, or rod) configured to pivot in a direction of an input force applied by an operator. The bar 40 can be straight, curved, bent, or jagged depending on the configuration of the lawnmower 10 and placement of the seat 90. The bar 40 can have a circular cross section when viewed perpendicular to a longitudinal axis of the bar 40. The bar 40 can have a cross section that is variable along the length of the bar 40. For example, the bar 40 can have a portion that has a narrower or wider cross section than other portions of the bar 40 corresponding to where the operator grasps the control handles 30. The bar 40 can have an upper part 42 and a lower part 44 (also referred to as upper and lower portions, sections, or members). The upper part 42 can be substantially horizontal (e.g., substantially parallel to a plane perpendicular to the rotary axis of the mower blades 18). The lower part 44 can be configured to pivotably mount to a pump 82. The upper part 42 can include a grip 50 disposed thereon. The bar 40 can be metallic, plastic, an alloy, or any other suitable material that is rigid enough to withstand input force from an operator.

The pair of grips 50 can have an inner surface 52 (also referred to as an inner wall or circular inner wall) and an outer surface 54 (also referred to as an outer wall). The outer surface 54 can have a non-circular shape and the inner surface 52 can have a shape that is different than the shape of the outer surface 54. For example, in the exemplary embodiment, the inner surface 52 can have a shape that is circular in a cross-section taken perpendicular to the longitudinal axis LA of the grip 50 or bar 40, and the outer surface 54 can have a shape that is non-circular in a cross section taken perpendicular to the longitudinal axis of the grip 50 or bar 40. The cross-section shape of the inner surface 52 is not limited to circular shapes. The shape of the inner surface 52 can be triangular, square, or any other shape that is different than the non-circular shape of the outer surface 54. Each bar 40 can be inserted inside a respective one of the grips 50 and disposed against the inner surface 52. The inner surface can be circular so as to receive a circular shaped bar 40. The inner surface 52 and the outer surface 54 can have a crest depth dimension C and a width dimension W. The crest depth dimension C can be in the direction of the lawnmower's forward and reverse direction (e.g., parallel with a plane perpendicular to the rotary axis of the blades 18). That is, the crest depth dimension C can be in the direction that the control handle 30 moves when a force is applied by an operator of the lawnmower 10. The width dimension W can be in a direction substantially perpendicular to the crest depth dimension C. The pair of grips 50 can have a length that covers only a horizontal portion of the control handles 30. Alternatively, the pair of grips 50 can have a length that covers more than a horizontal portion of the control handles 30. The pair of grips 50 can have a length that covers a portion of the control handles 30 sufficient to allow an operator to grasp the pair of control handles 30 and allows the operator to directly contact the grip 50 but not directly contact the bar 40. That is, the length of the grip 50 can be sufficient to be disposed between the hands of the operator and the bar 40 when the operator is grasping the control handles 30 during operation of the lawnmower 10. The inner surface 52 of each grip 50 can have a shape in a cross section taken perpendicular to a longitudinal axis of the grip that is a circle and the outer surface 54 can have a cross section taken perpendicular to a longitudinal axis of the grip that is oval, such as an oblong circle or such as two elliptical surfaces connected to each other to form a tear drop shaped oval. The outer surface 54 can have a crest depth that is greater than the width of the outer surface 54. The outer surface 54 can also be oval shaped, egg shaped, or ellipse shaped. The grip 50 can be made of a soft durable rubber, polymer foam, plastic, or any material that increases operator comfort while maintaining grip durability.

Figure 3:
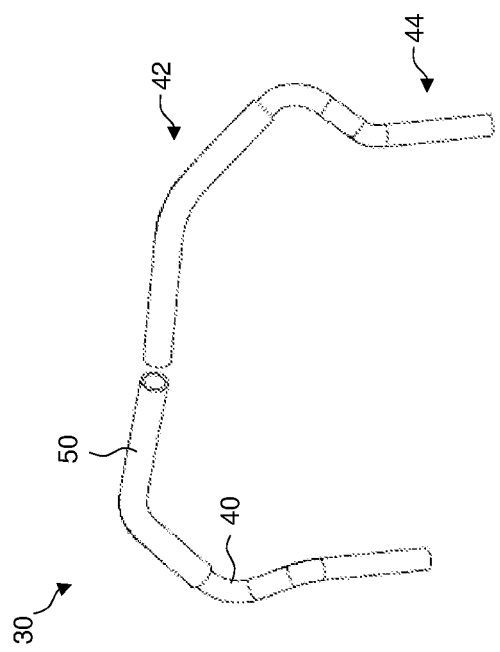
FIG. 3 is a perspective view of a pair of control handles of the lawnmower of FIG. 2.

Referring to FIG. 3, there is shown a pair of control handles 30 including a bar 40 and a grip 50. The bar 40 can have a lower part 44 and an upper part 42. The lower part 44 can be substantially vertical. The lower part 44 can be configured to pivotably mount to a pump 82 and/or to a motor 84. The lower part 44 can directly, or through any number of intermediary linkages, connect to the motor 84 and/or pump 82. In the exemplary embodiment of FIG. 1, the lower part 44 is pivotably mounted to the frame, around pivot point P, in order to allow a force to be applied to a hydraulic motor 84 and/or a hydraulic pump 82. The upper part 42 of the bar 40 can extend away from the lower part 44 at an angle such that the upper part is substantially horizontal (or parallel with respect to a plane perpendicular to the rotational axis of the blades 18). The grip 50 can be disposed on the upper part 42, or both the upper part 42 and the lower part 44. The upper part 42 and the lower part 44 can be straight with a bent joint located therebetween such that the upper part 42 and lower part 44 are substantially perpendicular with respect to each other. One or both of the upper part 42 and lower part 44 can also include a bent shape.

In the embodiment shown in FIG. 3, the upper part 42 and lower part 44 are formed to allow an area for the operator to sit on the seat 90 of the lawnmower 10 such that the operator's legs or body do not contact or interfere with the pair of control handles 30 as the operator exerts force on the pair of control handles 30. The upper part 42 and the lower part 44 can be formed in any shape that allows the control handles 30 to pivot around pivot point P during operation without contacting the operator's lower body. The bent shape can be formed to allow a greater area for an operator to sit in the seat 90 without interference from the control handles 30. The upper part 42 and lower part 44 can be made of a material that is metallic, alloy, plastic, carbon fiber, or any other material that has a suitable rigidity to withstand forces from an operator. The upper part 42 and lower part 44 can be made from the same material or each made from different materials.

Figure 4:
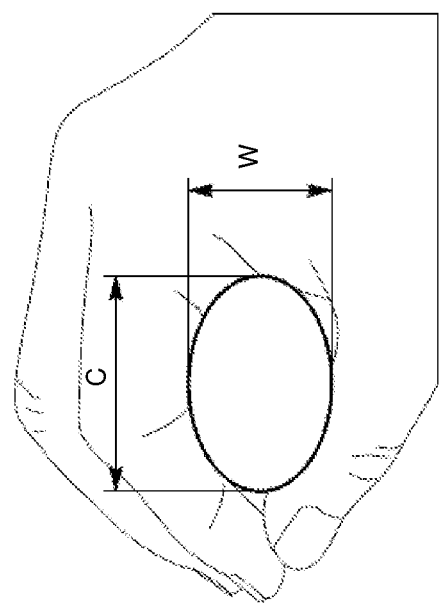
FIG. 4 is a side view of an operator grasping a control handle of FIG. 3 with an oval superimposed over the cross section of the grip of the control handle.

Referring to FIG. 4, there is shown an operator's hand grasping a control handle 30 with an oval superimposed on a cross section of the outer surface 54 of the grip 50. The outer surface 54 can have a crest depth greater than its width, and can have any cross section shape having a crest depth greater than the width (as viewed along a longitudinal axis of the grip 50 as shown in FIG. 4 if the grip were to be located within the depicted operator's hand). Examples of shapes for the cross section of the outer surface 54 can include, but are not limited to, oval, egg-shaped, and elliptical. The outer surface 54 of the grip 50 can be formed to fit the natural shape of an operator's hand when grasping the control handle 30. As a result, the operator can experience increased comfort while grasping the control handle 30. Additionally, the operator can experience increased comfort for long durations of use of the lawnmower 10.

Figure 5:
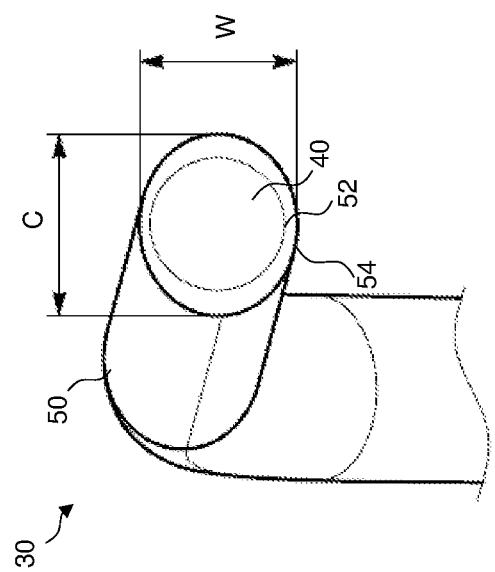
FIG. 5 is an enlarged orthogonal view of a cross section of the upper part of one of the control handles of FIG. 3.

Referring to FIG. 5, there is shown a portion of a control handle 30 including a bar 40 and a grip 50. The grip 50 can include an inner surface 52 and an outer surface 54. The outer surface 54 of the grip 50 can have a crest depth greater than the width. The bar 40 can have a tubular shape and the cross section of the bar 40 can be a circle as viewed along its longitudinal axis. The grip 50 can be disposed with the bar 40 inserted or located inside such that the inner surface 52 is disposed against the bar 40. That is, an outer surface of the bar 40 can be continuously in contact with along the entire inner surface 52 of the grip 50. The inner surface 52 of the grip 50 can be an inward facing portion of an inner ring 56 and the outer surface 54 of the grip 50 can be an outward facing portion of an outer ring 58. The bar 40 can be disposed against the inner ring 56. The grip 50 can be removable and separable from the bar 40. Different shaped grips 50 can be used with the bar 40, and the grip 50 can have an ergonomic shape. For example, a grip 50 having an egg-shaped outer ring, an ellipsis outer ring, or any shape contouring to the natural shape of a hand when grasping the control handle 30 can be used. The shape of the inner surface 52 and the outer surface 54 can also have any the above described shapes or any shape contouring to the natural shape of a hand when grasping the control handle 30. The outer ring 58 can be more or less oval in some portions along the length of the grip 50 than in other portions. For example, the grip 50 can have a greater thickness (as defined by the area between the inner surface 52 and the outer surface 54) or variable thickness in areas where an operator commonly grasps the control handle 30.

Figure 6:
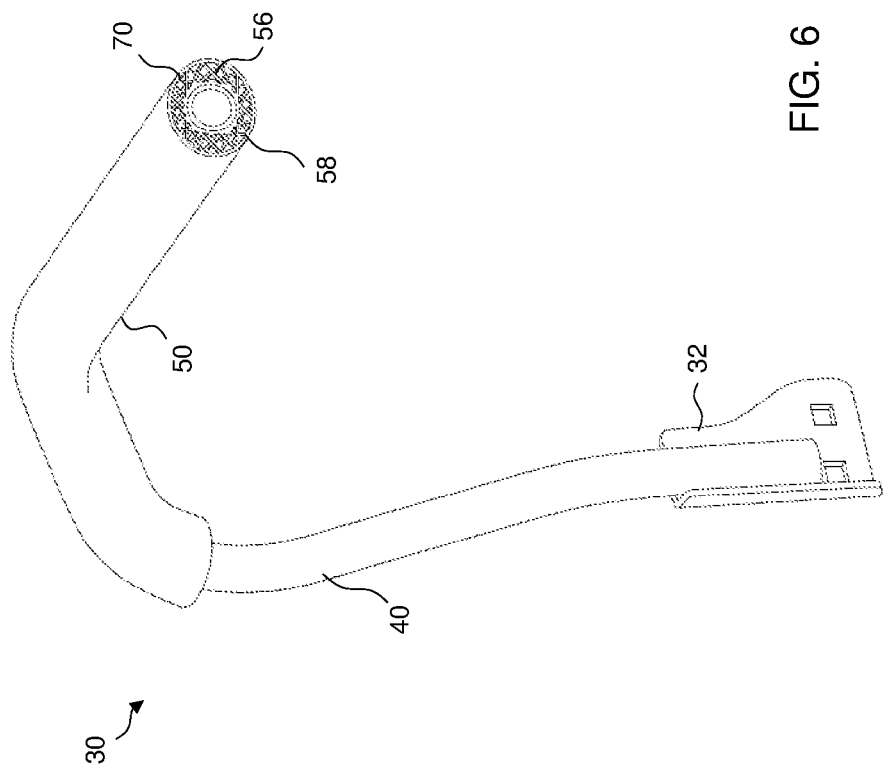
FIG. 6 is an enlarged orthogonal view of a cross section of a control handle of the lawnmower of FIG. 2 including a bracket mount.

Referring to FIG. 6, there is shown a control handle 30 including a bracket mount 32, a bar 40, and a grip 50 including a webbing 70. The bracket mount 32 can be attached to the control handle 30 and configured to attach to the frame 12, a pump 82, a motor 84, or any combination thereof. The bar 40 can be configured to pivot in a direction of an input force applied by an operator to allow a variable output force by a drivetrain, such as a hydrostatic drivetrain. The bar 40 can be a solid bar or hollow bar. The bar 40 can be metal, alloy, carbon fiber, plastic, or any suitable material known to one skilled in the art that allows for a rigid structure capable of withstand an input force by an operator.

The grip 50 can include a webbing 70 that connects the inner ring 56 to the outer ring 58. The webbing 70 can be a webbing-like structure in between the inner ring 56 and the outer ring 58 that deforms in areas of high pressure to relieve the pressure on an operator's hand(s). The webbing 70 can be solid, semi-solid, porous, or structures that create geometrical openings within. The webbing 70 can be made of the same material as the grip 50, or can be made of any other material that allows the webbing 70 to be resiliently deformable. Examples of materials that the webbing can be made of include, but are not limited to, rubbers, plastics, gels, foams, or other polymers. The webbing 70 can be made of a combination of different materials.

Figure 7:
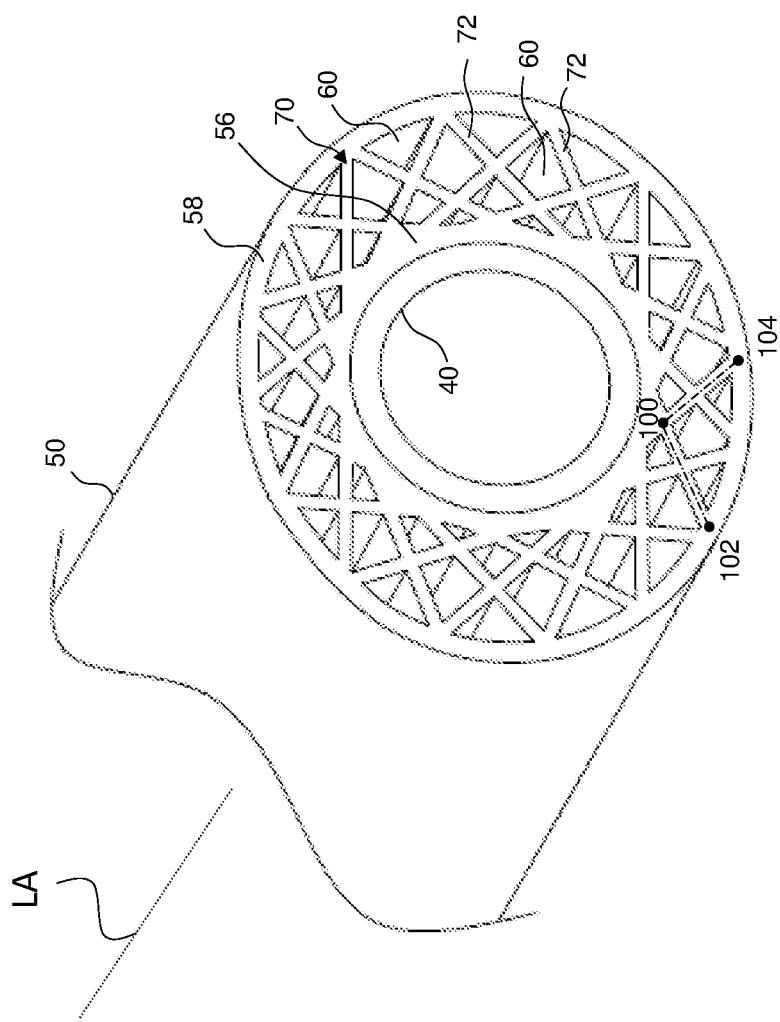
FIG. 7 is an enlarged view of a cross section of the upper part of the control handle of FIG. 6.

Referring to FIGS. 6 and 7, there is shown the grip 50 including the inner surface 52, outer surface 54, inner ring 56, outer ring 58, and webbing 70. The webbing 70 can be a lattice structure. The webbing 70 can be symmetrical or asymmetrical depending on application. The webbing 70 can include a plurality of strips (also referred to as strands, supports, fibers, or ribs) disposed between the inner ring 56 and the outer ring 58. The plurality of strips 72 can be straight. The plurality of strips 72 can connect the inner ring 56 to the outer ring 58. At least one of the plurality of strips 72 can connect to the inner ring 56 at a first end and connect to the outer ring at a second end. Another one of the plurality of strips 72 can connect to the inner ring 56 at a first end adjacent to or abutting the first end of the other of the plurality of strips and connect to the outer ring at a second end spaced away from the second end of the other of the plurality of strips. For example, in FIG. 7, one strip 72 has a first end connected to the inner ring 56 at first point 100 and a second end connected to the outer ring 58 at second point 102. Another strip 72 has a first end connected to the inner ring 56 adjacent or abutting or coincident with the first point 100 and a second end connected to the outer ring 58 at a third point 104 spaced away from and different from the second point 102.

Alternatively, the another one of the plurality of strips 72 can connect to the inner ring 56 at a first end at a location that is spaced away from the first point 100 and connect to the outer ring 58 at a second end at the second point 102.

In the embodiment shown in FIG. 7, one of the strips 72 can connect to the inner ring 56 at a first point 100, the outer ring 58 at a second point 102, and another one of the strips 72 at a location between the first point 100 and the second point 102.

At least one of the plurality of strips 72 can connect to the inner ring 56 at a first end that intersects with the direction of the radial direction of the inner ring 56 and connect to the outer ring 58 at a second end. Another of the plurality of strips 72 can connect to the inner ring 56 at a first end that intersects with a different radial direction of the inner ring 56.

At least one of the plurality of strips 72 can intersect with another of the plurality of strips between the inner ring 56 and the outer ring 58. At least one of the plurality of strips 72 can intersect with any number of the plurality of strips 72 between the inner ring 56 and the outer ring 58.

The webbing 70 can include a plurality of strips 72 disposed in a direction that intersects a radial direction of the inner ring 56. That is, the plurality of strips 72 can be disposed such that each strip 72 connects to the inner ring 56 at a non-perpendicular angle. The plurality of strips 72 can be disposed such that each strip 72 connects to the outer ring 58 at a non-perpendicular angle. The plurality of strips 72 can be disposed so that each strip 72 connects at a first end to the inner ring 56 at a non-perpendicular angle and connects at a second end to the outer ring 58 at a non-perpendicular angle. The webbing 70 can include a plurality of strips 72 that can include at least one strip 72 that connects at a first end to the inner ring 56 and connects at a second end to the outer ring 58.

The webbing 70 can include at least one strip 72 that connects at a first end and second end to the outer ring 58 and is bent or is arcuate such that the strip also connects at a point between the first end and the second end to the inner ring 56. At least one of the plurality of strips 72 can intersect with any number of the other plurality of strips 72. The plurality of strips 72 can connect to the outer ring 58 at an end point and connect to the inner ring 56 at an edge. The plurality of strips 72 can be made of all the same material, different materials, or a combination of materials.

Referring to FIG. 7, there is shown a close up view of a control handle 30 having a bar 40 inserted into a grip 50 having an outer ring 58, an inner ring 56, and a webbing 70 that connects the inner ring 56 to the outer ring 58. The webbing 70 can be elastically deformable such that when a force is applied to the grip 50 the webbing 70 can deform inwardly toward the inner ring of the grip 50. When the force is removed from the grip 50, the webbing can return to the shape it had prior to the force being applied.

The webbing 70 structure can be made in a variety of shapes. Examples of the webbing structure shape can include, but are not limited to, x pattern, hex pattern, square pattern, star pattern, triangle pattern, and circular pattern. The x pattern can be formed by strips 72 that intersect between the inner ring 56 and the outer ring 58. The star pattern can be formed by strips 72 interesting to form star shapes between the inner ring 56 and the outer ring 58. The webbing 70 can be made of a combination of patterns. For example, the webbing 70 can be formed with a combination of triangular patterns and trapezoidal patterns. The webbing 70 can include a plurality of strips 72 that are triangularly shaped strips. In another example, the webbing 70 can include a plurality of strips 72 that are arranged in a triangular pattern. That is, the cross section of the webbing 70 can resemble a pattern of triangles having similar or different sizes.

The grip 50 can include a plurality of cavities 60. The cavities 60 can include a cavity with a first shape and a cavity having a second shape different from the first shape. The plurality of cavities 60 can extend along the length of the grip 50. Alternatively, the plurality of cavities 60 can be located only along portions of the grip 50 forming pockets within the grip 50. The plurality of cavities 60 can be uniform in shape. The plurality of cavities 60 can be arranged in a symmetrical arrangement or pattern. The plurality of cavities 60 can also be nonuniform in shape and can be asymmetrical in arrangement or pattern.

An operator of the lawnmower 10 can steer and move the lawnmower 10 by applying a force to the pair of control handles 30 via grips 50. Applying an equal force to both control handles 30 in the forward direction of the lawnmower 10 will drive the pair of wheels 22 in the forward direction F and cause the lawnmower 10 travel in the forward direction. Increasing the force applied to both control handles 30 in the forward direction will increase the speed at which the lawnmower 10 travels in the forward direction. Likewise, applying an equal force in the reverse direction RR to the pair of control handles 30 will drive the pair of wheels 22 in the reverse direction RR and cause the lawnmower 10 to travel in the reverse direction. Applying a force in the forward direction F to one of the control handles 30 and applying a force in the reverse direction RR to the other control handle 30 will cause the lawnmower 10 to spin in the either a clockwise or counter clockwise direction.

While certain embodiments of the invention are described above, it should be understood that the invention can be embodied and configured in many different ways without departing from the spirit and scope of the invention.

One of ordinary skill in the art will readily understand that conventional components of various types of lawnmowers can be included in the embodiments described herein.

In alternate embodiments the power source can include an internal combustion engine instead or in addition to an electric motor. Additionally, the power source 20 of the lawnmower 10 can be a direct current motor or an alternating current motor.

The disclosed subject matter can also be incorporated into a ZTR mower that includes DC motors for driving each or a subset of the wheels 22. In this case, the blades 18 might have their own motors, and the control arms 30 would drive sensors (e.g., drive by wire) which control each of the wheel motors.

The general shape of the inner and outer portions of the grip/bar 40 can be substantially different from that depicted in the figures and still fall within the scope of the presently disclosed subject matter. For example, the bar itself (40) might be D-shaped or square shaped in cross-section taken along a longitudinal axis of the bar 40, or even elliptical, circular, or non-symmetrical in shape in cross section, as well as polygonal and other shapes in cross-section.

In another alternate embodiment, the outer surface of the grip can further include protrusions or patterns that increase friction or grip between the outer surface of the grip and the operator's hand. Waterproofing materials can be added to the grip to improve operator control over the lawnmower.

In another alternate embodiment, the webbing and the surfaces of the grip can be made of different materials. The outer surface of the grip can be made of a different material than the inner surface of the grip.

It is contemplated that the transmission can be a manual transmission, automatic transmission, friction-disc transmission, or a continuously-variable transmission (CVT).

The handle grip can be manufactured in various manners that fall within the scope of the invention. For example, the handle grip 50 can be a single, continuous, and integral material. Thus, the grip 50 can be formed through an extrusion process, an injection molding process, a blow molding process, or other similar process. Alternatively, the outer ring 58 and inner ring 56 can be separately formed and then a webbing 70 can be inserted or formed therebetween or at the ends thereof to create the grip 50. The webbing can be present along an entire length of the grip 50 or can be intermittently present at various locations along the longitudinal axis LA of the grip 50, such as at each end.

In alternate embodiments, the pivot point P can be located in other locations other than the one depicted. Pivot point P can be located higher or lower on the frame or further in the forward F or reverse direction R of the frame.

One of ordinary skill would recognize that each of the control handles can include a neutral position that does not drive a respective motor connected to a drive wheel in any direction. The neutral positions can be located between the forward position and the reverse position of the control handles. That is, there can be a position of the control handles that does not cause the lawnmower to move in any direction but to remain stopped.

While the subject matter has been described in detail with reference to exemplary embodiments thereof, it will be apparent to one skilled in the art that various changes can be made, and equivalents employed, without departing from the scope of the invention as recited in the appended claims.

What is claimed is:

1. A lawnmower comprising:
a frame;
a deck suspended from the frame and including a cutting chamber;
a power source mounted on the frame;
at least one blade rotatably supported in the cutting chamber and rotationally driven by the power source;
a pair of control handles connected to and extending away from the frame, wherein each of the control handles comprises a bar configured to pivot in a direction of an input force applied by an operator, and a grip having an inner surface, wherein each bar is located inside a respective one of the grips and disposed against the inner surface of the respective one of the grips;
a pair of hydraulic pumps each pivotably connected to a respective one of the control handles;
a pair of hydraulic motors each in fluid communication with a respective one of the hydraulic pumps; and
a pair of drive wheels, wherein each hydraulic motor drives a respective one of the drive wheels, wherein each of the grips includes:
an inner ring, the inner surface is on the inner ring;
an outer ring spaced away from the inner ring;
a first strip connected to the inner ring at a first point and connected to the outer ring at a second point;
a second strip connected to the inner ring at third point spaced away from the first point, the second strip intersecting the first strip at a location on the first strip that is spaced away from the first point and the second point,
a third strip connected to the inner ring at the first point and connected to the outer ring at a fourth point that is spaced away from the second point; and
a fourth strip connected to the inner ring at a fifth point that is spaced away from the first point and the third point, the fourth strip intersecting the third strip at a location that is between the first point and the fourth point.

2. The lawnmower of claim 1, wherein
the inner ring has a cross section taken perpendicular to a longitudinal axis of the grip that is shaped as a circle, and the outer ring has a cross section taken perpendicular to the longitudinal axis of the grip that is shaped as an oval, and
the first strip, the second trip, the third strip, and the fourth strip form a resiliently deformable webbing.

3. The lawnmower of claim 1, wherein
the bar is a hollow metallic bar.

4. The lawnmower of claim 2, wherein
the webbing defines a plurality of cavities and at least one of the plurality of cavities is a first shape and at least another one of the plurality of cavities is a second shape different from the first shape.

5. The lawnmower of claim 1, further comprising:
at least one pair of caster wheels mounted on the frame, wherein
the deck is disposed between the pair of caster wheels and the pair of drive wheels;
a footplate mounted on the frame; and
a seat mounted on the frame, wherein
the pair of control handles are disposed between the footplate and the seat, the grips are disposed above the seat, and each of the control handles directs a respective one of the drive wheels in a direction of operator input.

* * * * *